United States Patent [19]

Iguchi et al.

[11] 4,153,458

[45] May 8, 1979

[54] PHOTOGRAPHIC BINDER MIXTURE OF THREE POLYMERS

[75] Inventors: Shigeru Iguchi; Tamotu Iwata; Tetsuo Yano, all of Nagaokakyo, Japan

[73] Assignee: Mitsubishi Paper Mills, Ltd., Tokyo, Japan

[21] Appl. No.: 847,598

[22] Filed: Nov. 1, 1977

Related U.S. Application Data

[62] Division of Ser. No. 678,715, Apr. 20, 1976, Pat. No. 4,119,463.

[30] Foreign Application Priority Data

Apr. 24, 1975 [JP] Japan .................................. 50-50078

[51] Int. Cl.[2] ......................... G03C 1/76; G03C 1/78; C03C 1/72

[52] U.S. Cl. ....................................... 96/67; 96/84 R; 96/85; 96/86 R; 96/87 R; 96/87 A; 96/114; 252/302; 252/316; 260/29.6 RB; 260/29.6 WA

[58] Field of Search ................. 96/67, 84 R, 85, 86 R, 96/87 R, 87 A, 114; 252/302, 316; 260/29.6 WA, 29.6 WB, 846, 29.6 RB

[56] References Cited

U.S. PATENT DOCUMENTS

| | | | |
|---|---|---|---|
| 2,527,268 | 10/1950 | Hart | 96/97 |
| 3,544,327 | 12/1970 | Abel et al. | 96/114 |
| 3,723,127 | 3/1973 | Yano et al. | 96/114 X |
| 3,726,822 | 4/1973 | Bonin et al. | 260/29.6 WB |
| 4,019,908 | 4/1977 | Wright | 96/114 |
| 4,033,772 | 7/1977 | Sprung et al. | 96/114 |
| 4,120,724 | 10/1978 | Tatsuta et al. | 96/87 A |

*Primary Examiner*—Edward C. Kimlin

*Attorney, Agent, or Firm*—Cushman, Darby & Cushman

[57] ABSTRACT

A photographic binder prepared by heating a mixed aqueous solution of styrene-maleic anhydride copolymer, isobutylene-maleic anhydride copolymer and polyvinyl alcohol in acidic state makes it possible to coat a photographic coating liquid for forming photographic layers in the same manner as in the case of using gelatin and furthermore gives excellent physical properties to the resultant photographic layers.

15 Claims, No Drawings

PHOTOGRAPHIC BINDER MIXTURE OF THREE POLYMERS

This is a division of application Ser. No. 678,715 filed Apr. 20, 1976, now U.S. Pat. No. 4,119,463.

BACKGROUND OF THE INVENTION

The present invention relates to a photographic binder for forming photographic layers of photographic light sensitive materials. The term "photographic layers" herein used includes silver halide light sensitive layers, protective layers, inter layers, under coat layers, diffusion transfer image receiving layers, etc.

Many attempts have been made to produce photographic light sensitive materials using synthetic resins in place of gelatin as a binder for photographic layers. However, most of the synthetic resins do not solidify and gel even if their solutions are cooled. Thus, with such synthetic resins, it is impossible to form uniform photographic layers by cooling the solution to cause loss of fluidity as in the case of using gelatin. Even if gelatin is used, gelling of the solution is not enough to coat it when gelatin concentration is lower than a certain limit (usually 1%).

A number of vinyl monomers have been known which can copolymerize with maleic anhydride to form alternating copolymers. Examples of these vinyl monomers are olefinic unsaturated compounds such as styrene, vinyl methyl ether, vinyl butyl ether, vinyl acetate, ethylene, isobutylene, etc. Use of these alternating copolymers for production of light sensitive materials is disclosed, e.g., in Japanese Patent Publication No. 4272/64, Japanese Patent Publication No. 22662/69 and Japanese Laid-open Patent Application No. 15123/72.

Example of use of a treated product (called "PVA treated product" hereinafter) obtained by heating such maleic anhydride alternating copolymer together with polyvinyl alcohol as a binder of the photographic layers is disclosed in Japanese Patent Publication No. 22504/71 where a heat modified product of styrene-maleic anhydride copolymer and polyvinyl alcohol is used.

When the PVA treated product obtained by using the styrene-maleic anhydride copolymer disclosed in said Japanese Patent Publication is mixed with a photographic coating liquid having no gelling ability, such coating liquid can be coated on a support and dried in the same manner as in the case of using gelatin as a binder. However, the resultant dried photographic layer is hard and brittle. Therefore, the photographic layer of light sensitive materials which uses such PVA treated product is apt to form cracks or to curl up.

SUMMARY OF THE INVENTION

One object of the present invention is to make it possible to coat the photographic coating solution on a support by adding the synthetic resin composition of the present invention to the photographic coating solution which has no or insufficient gelling ability. It becomes possible by using the present PVA treated product as a binder for formation of photographic layers to produce light sensitive materials having excellent physical properties which have never been possessed by the conventional light sensitive materials using a large amount of gelatin.

Another object of the present invention is to provide light sensitive materials which can be subjected to rapid photographic processing such as rapid development and fixation and can stand photographic processing at high temperatures.

Further object of the present invention is to provide, as a photographic binder, a PVA treated product containing polyvinyl alcohol having a saponification degree of at least 95%, styrene-maleic anhydride copolymer and isobutylene-maleic anhydride copolymer which has no defects of said PVA treated product containing the styrene-maleic anhydride copolymer, which does not lose the conventional coating ability and which is improved in physical properties.

DETAILED DESCRIPTION OF THE INVENTION

Like styrene-maleic anhydride copolymer and other maleic anhydride alternating copolymers, isobutylene-maleic anhydride copolymer is highly miscible with polyvinyl alcohol in aqueous solution. When this mixed aqueous solution is heated in weakly acidic state, hydroxyl group of the polyvinyl alcohol molecule reacts with a part of carboxyl group of the maleic anhydride copolymer molecule to cause increase in viscosity of the mixed aqueous solution with increase in heating time. Thus, this mixed aqueous solution exhibits the properties different in various points from those of a mere mixed solution.

The PVA treated product obtained by reacting said isobutylene-maleic anhydride copolymer and styrene-maleic anhydride copolymer with polyvinyl alcohol as aqueous solutions shows marked increase in its viscosity with decrease in temperature to lose fluidity.

Therefore, when said PVA treated product is added to photographic coating liquid having no solidifying ability, this coating liquid can be coated on a support such as paper, film base and dried in the same manner as in the case of using gelatin.

That is, when said coating liquid is coated on a support and then cooled, viscosity of the coating liquid abruptly increases to nearly or completely lose fluidity. Therefore, the resultant coated light sensitive materials can be dried by suspending them in a drying room and supplying a drying air thereinto in the same manner as in the case of using gelatin. Furthermore, the defects of the PVA treated product obtained by reacting only styrene-maleic anhydride copolymer with polyvinyl alcohol can be removed by use of the present PVA treated product, and the use of the present PVA treated product gives softness and other excellent physical properties to photographic layers.

The gelling tendency of such PVA treated product at low temperatures is due to mainly the gelling ability of styrene-maleic anhydride copolymer in a weakly acidic aqueous solution, but the gelling ability of the PVA treated product may vary depending on the kind of polyvinyl alcohol used since polyvinyl alcohol also has weak gelling ability.

That is, there are various kinds of polyvinyl alcohols differing in polymerization degree and saponification degree and especially difference in saponification degree has great effect on the properties of the resultant PVA treated product.

When the polyvinyl alcohol of at least 95% in saponification degree which is generally called completely saponified product is used, the gelling ability of the PVA treated product due to cooling is further incresed. It is preferred to use polyvinyl alcohol which has been subjected to secondary saponification treatment to obtain a saponification degree of nearly 100%.

Water resistance of the photographic layers obtained by coating and drying a coating liquid becomes higher with use of the PVA treated product obtained by using polyvinyl alcohol of higher saponification degree and strength of the photographic layers at wet state in the photographic processing such as development, fixation, washing, etc. increases. Thus, such photographic layers can stand processing at a high temperature.

The photographic layers obtained becomes stronger with use of polyvinyl alcohol of higher polymerization degree, but viscosity of the coating liquid at the coating temperature (usually 30°-40° C.) is increased and coating becomes difficult when the viscosity is too high.

Polymerization degree of polyvinyl alcohol must be suitably selected taking into consideration the resin concentration in the coating liquid which varies depending on the coating method and the object of the light sensitive materials, but the purpose can be mostly attained by using alone or in combination the commercially available polyvinyl alcohols having a polymerization degree of 300 to 2000.

As styrene-maleic anhydride copolymer and isobutylene-maleic anhydride copolymer which are other starting materials, those of relatively low polymerization degree are suitable and those of high polymerization degree are difficulty soluble or excessively high in viscosity and hence handling and coating become difficult. Those which have 300-1000 of repeating base units ($5\times10^4$ to $15\times10^4$ in terms of average molecular weight) are preferred.

Mixing ratio of (a) isobutylene-maleic anhydride copolymer, (b) styrene-maleic anhydride copolymer and (c) polyvinyl alcohol is very important and properties of the resultant PVA treated product depend on said ratio. With increase in the amount of the styrene-maleic anhydride copolymer, gelling ability increases, but properties of the photographic layer is deteriorated as mentioned hereinbefore. With increase in the amounts of isobutylene-maleic anhydride copolymer and polyvinyl alcohol, the properties of the photographic layer become superior, but gelling ability is lowered. Preferred mixing ratio is as follows: (a) 1 to 45% by weight, (b) 5 to 49% by weight and (c) 50 to 94% by weight. When the mixing ratio by weight (a):(b):(c) is 1:4:16, good results are obtained, but the ratio is not limited to said value and may vary depending on the purpose.

Temperature and time for heating the mixed aqueous solution of polyvinyl alcohol and maleic anhydride copolymers should be adjusted depending on molecular weight or mixing ratio of these resins, resin concentration and pH of the solution. Especially, the pH value of the solution while being heated is an important factor. When the pH is higher than 6, substantially no reaction proceeds and with decrease in the pH value, proceeding rate of the reaction increases. However, when the pH value is excessively low, the maleic anhydride copolymers are difficult to be dissolved (To proceed the dissolution of the maleic anhydride copolymers, dimethylformamide or dimethylsulfoxide may be added to the solution.). usually, the best result is obtained at a pH of about 4. When the heating temperature is lower than 60° C., the reaction rate is extremely low and with increase in the temperature the reaction time becomes shorter. Therefore, the heating is usually conducted at 95°-100° C. for several hours (3-4 hours).

With increase in the heating time the viscosity of the mixed solution increases, but when the heating time is too long, the solution gels even at a high temperature and becomes insoluble. The product obtained but a suitable heating shows conspicuous increase in viscosity at a pH of about 4 with decrease in the temperature and substantially loses its fluidity. Thus, a synthetic resin composition which makes it possible to form photographic layers by the same coating method as in the case of using gelatin as a binder can be obtained.

Thus obtained composition is a photographic binder having both the permeability of the photographic processing solution and the water resistance which are properties essential for the binder for formation of photographic layers. The water resistance of the photographic layers after coating and drying increases with increase in the heating time of said mixed synthetic resin solution, but the permeability of the treating solution is not damaged. Therefore, it is possible to produce the photographic layers which can stand the photographic treatments at a high temperature (35-40° C.). In the case of the processing at an ordinary temperature (about 20° C.), processing time can be shortened as compared with the light sensitive materials which use gelatin.

It has been recognized that especially the isobutylene-maleic anhydride copolymer greatly contributes to hastening of processing due to the increase in permeability of processing solution.

Specific methods for preparation of the synthetic resin composition used in the present invention will be explained below.

PREPARATION EXAMPLE 1

The following two solutions are separately prepared.

| | |
|---|---|
| Solution 1 | |
| 99% completely saponified polyvinyl alcohol (average polymerization degree 500) | 255 g |
| 99% completely saponified polyvinyl alcohol (average polymerization degree 1000) | 320 g |
| Water | 2500 g |
| Sodium hydroxide | 6 g |
| Solution 2 | |
| 20% solution of sodium salt of styrene-maleic anhydride copolymer (average molecular weight $8\times10^4$) | 700 g |
| Isobutylene-maleic anhydride copolymer (average molecular weight $8\times10^4$) | 35 g |
| Water | 1100 g |
| Dimethylformamide | 70 ml |
| Sodium hydroxide | 9 g |

The solution 1 was heated at higher than 90° C. for one hour to accomplish dissolution of the polyvinyl alcohol and simultaneous secondary saponification treatment and thereafter 50 ml of 12 N sulfuric acid was added thereto.

Separately, the solution 2 was heated to about 95° C. for one hour to dissolve the maleic anhydride copolymer. Thereafter, the two solutions were mixed with each other to obtain a pH value of 4 of the resultant mixed solution. This mixed solution was further heated to 95° C.-99° C. for 3 hours and then cooled. Water was added thereto to make up 5,000 g.

The resultant reaction product was stored. When necessary, this is taken out, heated to higher than 60° C. and redissolved for use.

Said product had a resin content of about 15% and a pH value of about 4. However, said product may be diluted to about 10% in resin content or may be reduced in pH value to about 6 by adding sodium hydroxide solution to prevent the progress of reaction during storage of long time.

| | |
|---|---|
| Preparation Example 2 | |
| Firstly, the following solution was prepared. | |
| Styrene-maleic anhydride copolymer (average molecular weight $8 \times 10^4$) | 35 g |
| Isobutylene-maleic anhydride copolymer (average molecular weight $6 \times 10^4$) | 15 g |
| 99% completely saponified polyvinyl alcohol (average polymerization degree 1000) | 250 g |
| Sodium hydroxide | 5 g |
| Dimethylformamide | 30 ml |
| Water | 2700 g |

Said solution was heated to 95° C. and after the resin was dissolved, the solution was kept at said temperature for 3 hours. Thereafter, the solution was cooled to make up 3000 g and allowed to stand to lose the fluidity. This PVA treated product was stored and when needed, taken out, heated to higher than 60° C. and redissolved for use.

Production of photographic layers with use of the PVA treated product obtained in said Preparation Examples 1 and 2 will be explained below.

The PVA treated product according to the present invention is mixed with other water soluble synthetic resin (such as polyvinyl alcohol, polyvinyl pyrrolidone, polyacrylamide, copolymers thereof or combination thereof), silver halide light sensitive emulsions containing a small amount of gelatin, other photographic coating liquid or photographic coating liquids having no gelling ability such as aqueous dispersion containing no resin content (which may contain a surfactant as a dispersant) used as a protective layer. These mixtures can be coated on a support in the same manner as a coating liquid containing a large amount of gelatin as a binder. Said PVA treated product has extremely excellent miscibility with, especially, resins containing basic groups such as imidazole group and amino group such as copolymers of acrylamide and vinylimidazole and gelatin and when they are mixed in a suitable ratio and suitable conditions (pH and ionic strength) are chosen, increasing rate in viscosity with decrease in temperature is extremely increased.

It has been recognized that the use of the isobutylene-maleic anhydride copolymer has a favourable action also on the miscibility of the PVA treated product with other synthetic resins or gelatin to contribute to improvement in photographic properties.

The proportion of the PVA treated product to be mixed with other resins varies depending on the kind of photographic layer and may be mixed in optional ratios to the resins. Usually, it is preferred to add the PVA product in an amount of at least 50% of the total resin component.

The viscosity of the mixed resin coating liquid at a relatively high temperature (e.g., 40° C.) at coating is markedly influenced by the conditions such as pH, ionic strength, etc. or by the addition of a polar organic solvent such as an alcohol. The addition of electrolytes such as alcohols and sodium nitrate usually reduces the viscosity at a high temperature and increases the increasing rate of viscosity at cooling to provide preferred result for coating. It is natural that the amount of electrolytes such as nitrates, citrates, etc. which are added to adjust the ionic strength and the pH value and the amount of organic solvents such as methyl alcohol, ethyl alcohol, etc. vary depending on the kind of photographic layer and the kind of the resin used in combination with the PVA treated product. However, the pH value of caoting liquid containing the PVA treated product is preferably 3–6.

The photographic layers containing the PVA treated product of the present invention may be used in all silver halide light sensitive materials such as those for black-and-white photograph, for color photograph, for platemaking and other special light sensitive materials.

Typical examples which used the present PVA treated product will be explained below, but the kinds of silver halide emulsion used and the additives used are not limited to those used in these Examples and all materials which are generally used in the silver salt photographic light sensitive materials may be used.

EXAMPLE 1

To a silver chlorobromide light sensitive emulsion of enlarging grade sensitivity and of 50 mol % in silver bromide content which was prepared by the usual method with use of a copolymer comprising 8 mol % of 1-vinyl-2-methylimidazole, 7 mol % of acrylic acid, 25 mol % of diacetoneacrylamide and 60 mol % of acrylamide were added zirconium nitrate and magnesium sulfate to result in precipitation. The precipitated emulsion was sufficiently washed with cold water. Thereafter, water the pH of which was adjusted to 4.3–4.5 with a mixed solution of citric acid and sodium citrate was added to said emulsion to redissolve the emulsion. To 1000 g of the dissolved emulsion (which contains 20 g of resin and 50 g of silver chlorobromide) were added 1300 g of 10% solution of the PVA treated product obtained in Preparation Example 1, 200 ml of ethyl alcohol and necessary additives such as stabilizer to make up 3000 g. This emulsion was coated on a photographic baryta paper at 40° C. and when the temperature was lowered to 15° C., the fluidity of the emulsion was lost. Thus, when the coated baryta paper was suspended and dried, photographic printing paper for enlargement was obtained.

Thus obtained photographic printing paper which used no gelatin had smaller tendency of causing curls and cracks due to overdrying than the printing paper which used gelatin as the binder. Furthermore, in the case of the former printing paper of the present invention, it was easy to obtain uniform gloss by ferrotype drying after photographic processing and higher maximum image density was provided.

EXAMPLE 2

To a contrast silver halide emulsion prepared with use of a copolymer containing 8 mol % of 1-vinyl-2-methyl imidazole, 7 mol % of acrylic acid and 85 mol % of acrylamide was added styrene-maleic anhydride copolymer to decrease the pH value to about 2.5 to obtain precipitated and concentrated emulsion. To 300 g of this emulsion (containing 25 g of resin and 25 g of silver chloride) were added 500 g of 10% solution of the PVA treated product prepared in the Preparation Example 1 and 50 g of 30% sodium nitrate solution and the pH was adjusted to 4.5 with sodium citrate solution. Thereafter, water was added thereto to make up 1500 g. This was coated and dried in the same manner as in Example 1.

Thus obtained photographic printing paper which used no gelatin had smaller tendency of causing curls and cracks due to overdrying than the printing paper which used gelatin as the binder. Furthermore, in the case of the former printing paper of the present invention, it was easy to obtain uniform gloss by ferrotype drying after photographic processing and higher maximum image density was provided.

EXAMPLE 3

To a polyvinyl alcohol silver chloride emulsion comprising 10 g of silver chloride, 12 g of polyvinyl alcohol and 120 g of water were added 300 g of the PVA treated product prepared in the Preparation Example 2 and 50 ml of ethyl alcohol to make up 500 g. This emulsion was coated on a baryta paper at 40° C. and then cooled to 15° C. This coated baryta paper was suspended and dried to obtain a photographic printing paper.

The permeation velocity of processing liquid through thus obtained photographic printing paper was high and this printing paper was suitable for rapid processing as a low speed printing paper for copying.

EXAMPLE 4

To 200 g of photographic silver halide emulsion (containing 5 g of gelatin and 25 g of silver iodobromide) prepared by the usual method with use of gelatin were added 350 g of 10% solution of the PVA treated product prepared in the Preparation Example 1 and 60 ml of ethyl alcohol to make up 650 g. This emulsion was coated at 35° C. on a photographic film base such as tetron base or cellulose acetate base subjected to usual under coating treatment. Thereafter, this coated base was cooled to 10° C. and dried to obtain a photographic film.

Not only thus obtained photographic film possessed the characteristics as mentioned in Examples 1–3 as compared with those which used gelatin as the binder, but also rotting and decomposition of gelatin was avoided and generation of mould was prevented to increase the stability of the film.

EXAMPLE 5

To 300 g of the PVA treated product solution prepared in the Preparation Example 2 was added 400 g of water and then 0.1 g of colloidal cadmium sulfide was added as a nucleus for physical development to said solution. Furthermore, additives such as surfactant, toner and fluorescent whitening agent were added thereto and the solution was coated on a photographic base paper of about 80 g/m$^2$ or a Tetron base film of about 0.05 mm in thickness in the same manner as in Examples 1–4 to obtain a positive paper or positive film for diffusion transfer.

The coated side of said positive paper and a coated side of a negative paper having a silver halide light sensitive layer prepared by the methods of the Examples 1–4 or the usual method were allowed to contact with each other after exposure and this was subjected to the well known diffusion transfer treatment with a developer containing carboxymethyl cellulose and sodium thiosulfate to obtain a diffusion transfer silver image on the positive paper.

EXAMPLE 6

Acrylonitrile butadiene copolymer latex (solid matter 40%) prepared by the usual method with use of a surfactant as a dispersant was diluted with water to make the solid matter 10%. 500 g of said latex was mixed with 200 g of 10% solution of the PVA treated product prepared in the Preparation Example 1 to obtain an aqueous coating liquid, which was coated on a hydrophobic film base such as polyester base film, etc. or a transparent base paper and dried to obtain a under coating layer on which light sensitive emulsion layer is to be coated.

EXAMPLE 7

600 g of water was added to 400 g of the PVA treated product prepared in the Preparation Example 2 and 5–10 g of a halation preventing dye which was decolored with the commercially available photographic processing liquid was dissolved in said PVA treated product. In the same manner as in Example 4, said solution can be coated as a halation preventing layer on the back side of the transparent film which was coated with an emulsion on the opposite side in Example 4.

What is claimed is:

1. A photographic binder prepared by heating an isobutylene-maleic anhydride copolymer, a styrene-maleic anhydride copolymer and polyvinyl alcohol in the form of aqueous solution wherein the ranges of amounts of the isobutylene-maleic anhydride copolymer, styrene-maleic anhydride copolymer and polyvinyl alcohol are 1–45% by weight, 5–49% by weight and 50–94% by weight, respectively.

2. A photographic binder according to claim 1, wherein said polyvinyl alcohol has a saponification degree of at least 95%.

3. A photographic binder according to claim 1, wherein said polyvinyl alcohol has an average polymerization degree of 300–2,000.

4. A photographic binder according to claim 1, wherein said isobutylene-maleic anhydride copolymer and styrene-maleic anhydride copolymer have an average molecular weight of $5\times10^4$–$15\times10^4$.

5. A photographic binder according to claim 1, wherein the heating is carried out at a temperature higher than 60° C.

6. A photographic binder according to claim 1, wherein the aqueous solution has a pH of about 4.

7. A photographic binder according to claim 5, wherein the heating is carried out at 95°–100° C.

8. A photographic binder according to claim 1 wherein the ratio of the amount of isobutylene-maleic anhydride copolymer, styrene-maleic anhydride copolymer and polyvinyl alcohol is 1:4:16.

9. A photographic binder according to claim 1 wherein the ratio of the amount of isobutylene-maleic anhydride copolymer, styrene-maleic anhydride copolymer and polyvinyl alcohol is 15:35:250.

10. A photographic light sensitive material which comprises a support and photographic layers coated thereon, wherein the photographic layers contain as a binder the product of claim 1.

11. A photographic light sensitive material according to claim 10 wherein the ratio of the amount of isobutylene-maleic anhydride copolymer, styrene-maleic anhydride copolymer and polyvinyl alcohol is 1:4:16.

12. A photographic light sensitive material according to claim 10 wherein the ratio of the amount of isobutylene-maleic anhydride copolymer, styrene-maleic anhydride copolymer and polyvinyl alcohol is 15:35:250.

13. A photographic light sensitive material according to claim 10 wherein the polyvinyl alcohol has a saponification degree of at least 95%.

14. A photographic light sensitive material according to claim 13 wherein the polyvinyl alcohol has an average polymerization degree of 300–2,000.

15. A photographic light sensitive material according to claim 14 wherein the isobutylene-maleic anhydride copolymer and styrene-maleic anhydride copolymer have an average molecular weight of $5\times10^4$ to $15\times10^4$.

* * * * *